(12) United States Patent
Meister

(10) Patent No.: US 7,988,102 B2
(45) Date of Patent: Aug. 2, 2011

(54) AIRCRAFT WITH A FLUID-DUCT-SYSTEM

(75) Inventor: Jürgen Meister, Neuenkirchen (DE)

(73) Assignee: Airbus Deutschland GmbH (DE)

( * ) Notice: Subject to any disclaimer, the term of this patent is extended or adjusted under 35 U.S.C. 154(b) by 498 days.

(21) Appl. No.: 11/596,134

(22) PCT Filed: May 11, 2005

(86) PCT No.: PCT/EP2005/005097
§ 371 (c)(1),
(2), (4) Date: Aug. 26, 2008

(87) PCT Pub. No.: WO2005/113334
PCT Pub. Date: Dec. 1, 2005

(65) Prior Publication Data
US 2009/0008505 A1    Jan. 8, 2009

Related U.S. Application Data

(60) Provisional application No. 60/606,668, filed on Sep. 2, 2004.

(30) Foreign Application Priority Data

May 13, 2004   (DE) .................. 10 2004 024 057

(51) Int. Cl.
*B64C 21/04* (2006.01)
(52) U.S. Cl. ........................ 244/207; 244/208
(58) Field of Classification Search .............. 244/118.5, 244/207–209, 53 R; 60/39.183; 454/71, 454/76
See application file for complete search history.

(56) References Cited

U.S. PATENT DOCUMENTS

| | | | | |
|---|---|---|---|---|
| 2,575,541 A | * | 11/1951 | Williamson, Jr. et al. | 62/241 |
| 3,423,011 A | * | 1/1969 | Stepp | 417/187 |
| 3,752,422 A | * | 8/1973 | Runnels et al. | 244/118.5 |
| 4,642,997 A | * | 2/1987 | Krafka | 62/87 |
| 5,114,100 A | | 5/1992 | Rudolph et al. | |
| 5,143,329 A | * | 9/1992 | Coffinberry | 244/209 |
| 5,482,229 A | * | 1/1996 | Asshauer | 244/118.5 |
| 5,884,873 A | | 3/1999 | Breit | |
| 5,967,461 A | * | 10/1999 | Farrington | 244/118.5 |
| 6,045,088 A | * | 4/2000 | Saiz | 244/118.5 |
| 6,216,982 B1 | * | 4/2001 | Pfennig et al. | 244/209 |
| 6,289,665 B1 | * | 9/2001 | Saiz | 60/39.183 |

FOREIGN PATENT DOCUMENTS

DE    4320302 A1    12/1994
(Continued)

OTHER PUBLICATIONS

Office Action from Japanese Application No. 2007-512087 dated Nov. 24, 2010.

*Primary Examiner* — Galen Barefoot
(74) *Attorney, Agent, or Firm* — Lerner, David, Littenberg, Krumholz & Mentlik, LLP

(57) ABSTRACT

An aircraft with a fluid-duct system for extraction of the laminar layer and/or blowing out of fluid at vulnerable places of the outer skin, wherein the fluid-duct system (26, 19, 18) by means of switchable valves (6, 4) is connectable to a pump facility (3), which is driven by the exhaust air from the cabin for generating a reduced pressure for the extraction of the laminar layer.

6 Claims, 1 Drawing Sheet

FOREIGN PATENT DOCUMENTS

| | | |
|---|---|---|
| DE | 19820097 A1 | 11/1999 |
| EP | 0 630 807 A1 | 12/1994 |
| JP | 04-110299 A | 4/1992 |
| JP | 05-139385 A | 6/1993 |
| JP | 2000-203495 A | 7/2000 |
| RU | 2084377 C1 | 7/1997 |

* cited by examiner

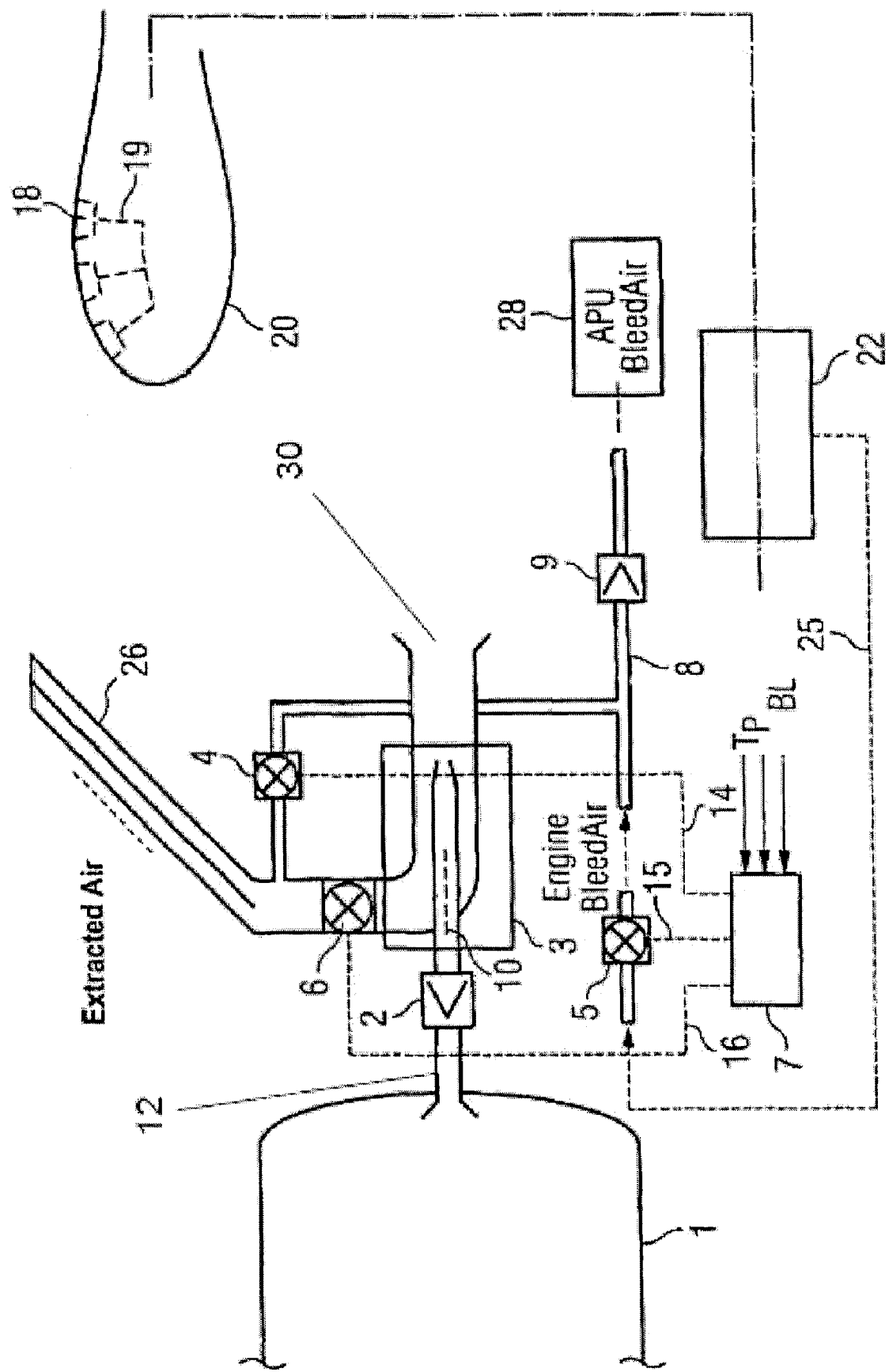

AIRCRAFT WITH A FLUID-DUCT-SYSTEM

The invention relates to an aircraft with a fluid-duct-system for extraction of the laminar layer and/or blowing out of fluid at vulnerable places of the outer skin.

It is known that the flow resistance of aircrafts can be reduced in that by applying a reduced pressure (laminar layer extraction) at places of the outer skin which tend to delaminate the laminar layer of the airstream flowing around them, a delamination of the flow or the conversion of a laminar flow into a turbulent flow, respectively, can be avoided. However, the reduced pressure reservoir required to this end needs additional energy.

The aim of the present invention is to provide an aircraft of the above mentioned kind in such a way that the extraction and/or blowing out of fluid can be carried out in an energy-saving way.

According to the invention, the posed aim is solved in that in an aircraft according to one embodiment, the fluid-duct-system, for producing a desired reduced pressure for the extraction of the laminar layer may by means of switchable valves be connected to a pump facility, which is driven by the outlet air of the cabin.

The design of an aircraft according to the invention, regarding to the energy-saving is therefore particularly advantageous, because in case of aircrafts nearly during the entire flight operation, the internal pressure in the cabin has to be considerably higher than the ambient pressure of the aircraft. The essential air exchange in the cabin requires the constant charge with fresh compressed air and the discharge of exhausted air. The exhausted air of the cabin, which on a cruising flight flows off with a considerable higher pressure as compared to the ambience of the aircraft is thus used to drive a pump facility, which, on its part, produces the desired reduced pressure within the fluid-duct-system, without the need for an additional energy source for this. The pump facility can be conventional, like, for example, a turbo pump. In case of an advantageous embodiment of the invention, the pump facility is a jet pump, the driving jet of which is produced by the cabin air. Such a facility is suitable for the present case of application in a special way in that it is easily built up insensitive to service, and has a small weight.

By means of the arrangement of switchable valves, it is guaranteed that the extraction of laminar layer can be switched off, which is at least indicated, if the difference of pressure between the jet drive of the cabin exhaust air and the ambient pressure does not facilitate a noteworthy extraction performance anymore, or if a state of flight of the aircraft is given, respectively, when an extraction of laminar layer is not desired.

In a further embodiment of the invention, it is suggested that the fluid-duct-system by means of switchable valves for attaining an over pressure for the blowing out is connectable to pipes of an aircraft engine leading compressed air and/or to an additional compression facility.

This embodiment, according to the invention has the advantage that the function of the fluid-duct-system is changed from an extraction system for extraction of the laminar layer into a pressure system for blowing out, which can always occur, if, for example, a pollution of the passage openings in the outer skin is to be blown away, or in case a freezing up of these openings has to be prevented. The compressed air out of the aircraft engine or a suitable auxiliary compression device, respectively, which, as a rule, has a higher temperature, is then led to the vulnerable places and blown out.

A further advantageous development of the invention consists in providing a control unit or a regulation unit, which by means of control lines actuates switchable valves depending on input parameters, like state of flight parameters, ambient parameters (temperature T, pressure P) and operating parameters BL of the aircraft engine. In this manner, depending on the state of flight, which means, for example, cruising altitude, approach to landing or take-off time, the fluid-duct-system can be switched in such a way that either over pressure is generated or the fluid-duct-system is totally switched off, i.e., a passing through cannot take place.

According to another advantageous embodiment, the passage cross sections of the switchable valves shall be regulation controllable. Thereby, a slow increase in pressure within the fluid-duct-system can, for example, be facilitated, or the quantity of air, which is conducted through the openings within the outer skin, can be regulation controlled, respectively, either outwards, by means of over pressure or inwards, by means of reduced pressure.

Eventually, a further advantageous development of the invention consists in arranging in an exhaust pipe, which guides from the cabin to the jet pump, a non-return valve, which prevents an inflow of air into the cabin. This non-return valve is preferably a safety arrangement, which prevents the pressure within the cabin from falling to an undesired extent. Such a falling would then be applied, for example, in case the performance of the supply of compressed air to the cabin would be falling or be even dropped out. In such cases, due to the function of the non-return valve, a desired pressure level in the cabin is maintained.

With reference to the enclosed drawing, an embodiment of the invention is illustrated. The drawing shows a schematic diagram of a fluid-duct-system of an aircraft.

An exhaust pipe 12 guides from an aircraft cabin 1, into which a non-return valve 2 is arranged, to a jet pump 3, which is provided with an exhaust outlet port 30, which opens out to the ambience. The delivery rate of the jet pump 3 is dependent on the pressure difference between the ambience and the aircraft cabin. This pressure difference is considerable during the greatest part of the operation time of the airplane, i.e. while in cruising altitude. The driving jet of the jet pump 3 is identified with 10. Due to the considerable pressure difference, a supercritical operation of the jet pump 3 is possible. A fluid-duct system 26 is connected to the suction line of the jet pump 3, wherein in the range of jet pump 3 in the fluid-duct system 26, a switchable stop valve 6 is provided. The cross-section of the stop valve 6 shall be adjustable. The operation of the stop valve 6 is effected by means of a control line 16, which, on its part, is acted upon by means of a control unit 7. The fluid-duct system 26 is connected via interconnecting ducts 19 with the openings 18 in the outer skin 20 of the aircraft (see schematic diagram in the upper right hand side corner of the FIGURE). In the shown embodiment, the openings 18 are in the front region of the pressure side of one airfoil of the aircraft. However, there are further positions alternatively or additionally conceivable, at which appropriate openings 18 are provided, either for the extraction of laminar layer or blowing out of hot-air. In the outer skin, the openings are preferably designed as a perforated area or as an area provided with slots.

The fluid-duct system 26 is connected via a switchable blow-out valve 4 with a compressed air line 8. The compressed air line 8 itself, via a switchable bleed air valve 5 and a bleed air line 25 is connected to an appropriate position of the aircraft engine 22. The air bleed valve 5 is charged via a control line 15 by the control unit 7. Furthermore, via a protection valve 9 which is designed as a non-return valve, the compressed air line 8 is alternatively or additionally connected with a compression facility 28. The compression facility 28 can be a compressor driven by the aircraft engine or an independent compressed air aggregate. An additional arrangement of the compressor as supplier of compressed air for the fluid-duct system 26 additionally to the bleed air line 25 of the aircraft engine 22 can make sense, in order still to generate a desirable pressure level in the fluid duct 26 in certain conditions of the aircraft engine, when bleed air is not supposed to be branched off.

The control of the operation lines 14, 15, 16 to the switchable valves 4, 5, 6 is effected depending on state of flight parameters, ambience parameters like, for example, temperature T and pressure P, and operating parameters BL of the aircraft engine 22.

In steady state cruise flight, the jet pump 3, due to the different pressure level between cabin 1 and ambience, generates the necessary suction airstream required to thereby implement an extraction of laminar layer through the openings 18 in the outer skin 20 of the aircraft. At the same time, the non-return valve 2 and the switchable stop valve 6 are open, while the blow-out valve 4 and, if necessary, the air bleed valve 5 and the protection valve 9, which is designed as a non-return valve, are closed. In case of a partial or complete breakdown of the compressed air regulation control of the cabin, the non-return valve 2 closes automatically, and thus prevents a further pressure drop in the cabin 1.

If individual state of flight parameters, ambience parameters or operating parameters of the aircraft engine indicate hazard that the openings 18 are blocked or that icing hazard exists, a reverse control of the switchable valves is performed by means of the control unit 7, namely in such a way that stop valve 6 is closed, while the blow-out valve 4 and/or the air bleed valve 5 is opened. The protection valve 9 then opens automatically.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

LIST OF REFERENCE SIGNS 1 aircraft cabin
2 non-return valve
3 jet pump
4 blow-out valve
5 air bleed valve
6 stop valve
7 control unit
8 compressed air line
9 protection valve
10 drive jet
12 exhaust line
14}
15} control lines to the switchable valves 4, 5, 6
16}
18 openings in 20
19 interconnecting ducts
20 outer skin of the aircraft
22 aircraft engine
25 bleed air line
26 fluid-duct system
28 compression facility

The invention claimed is:

1. An aircraft having a fluid-duct system for extraction of the laminar layer and/or blowing out of fluid at vulnerable places of the outer skin, wherein a fluid-duct system is connectable to a pump facility driven by exhaust air of a cabin generating a desired reduced pressure for the extraction of the laminar layer and a switchable valve connecting the fluid-duct system and the pump facility;
   wherein a control unit or a regulation unit is provided, which, depending on input parameters, actuates the switchable valves by means of control lines;
   wherein for attaining an over pressure for the blowing out, the fluid-duct system, by means of switchable valves, is connectable to lines guiding compressed air of an aircraft engine and alternatively or additionally connectable to lines guiding compressed air from an additional compression facility.

2. An aircraft according to claim 1, wherein the pump facility is a jet pump, the drive jet of which is formed by the exhaust air of the cabin.

3. An aircraft according to claim 1, wherein the compressed air is embodied as a hot air.

4. An aircraft according to claim 1, wherein the cross-sections of passage of the switchable valves may be regulated.

5. An aircraft according to claim 1, wherein there is arranged in an exhaust line, which guides from the cabin to the jet pump, a non-return valve, which prevents an inflowing of air into the cabin.

6. An aircraft according to claim 1 wherein said input parameters are selected from the group consisting of cabin pressure, temperature T, pressure P, and operating parameters BL of the aircraft engine.

* * * * *

UNITED STATES PATENT AND TRADEMARK OFFICE
CERTIFICATE OF CORRECTION

PATENT NO. : 7,988,102 B2  
APPLICATION NO. : 11/596134  
DATED : August 2, 2011  
INVENTOR(S) : Jürgen Meister Page 1 of 1

It is certified that error appears in the above-identified patent and that said Letters Patent is hereby corrected as shown below:

On the title page item (75) Inventor: "Neuenkirchen" should read --Buxtehude--

Signed and Sealed this  
Ninth Day of July, 2013

Teresa Stanek Rea  
*Acting Director of the United States Patent and Trademark Office*